Dec. 7, 1937.  V. H. ROEHRICH  2,101,819
EXTRACTOR
Original Filed June 5, 1929
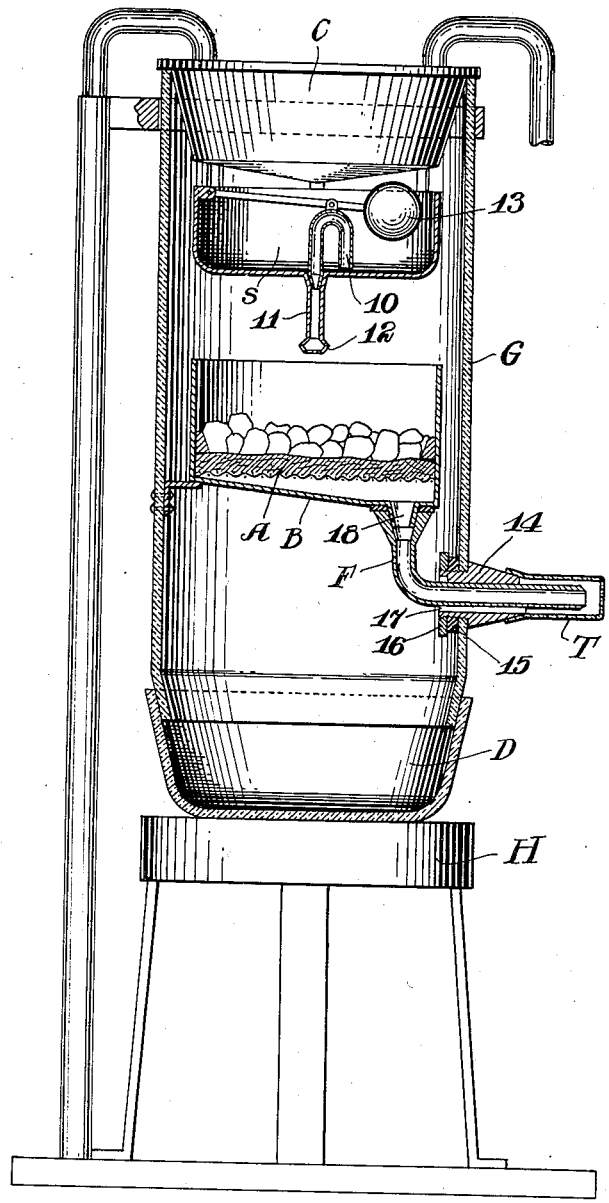
Inventor
Victor H. Roehrich
By Howard L. Fischer
Attorney Patented Dec. 7, 1937

2,101,819

UNITED STATES PATENT OFFICE 2,101,819

EXTRACTOR

Victor H. Roehrich, St. Paul, Minn.

Original application June 5, 1929, Serial No. 368,727. Divided and this application January 5, 1935, Serial No. 554

6 Claims. (Cl. 87—6)

My invention relates to an extractor of a type particularly adapted for the removal of materials soluble in oil solvents from insoluble materials. The apparatus is particularly applicable to the separation of bitumens, oils, fats, waxes, resins, gums, drugs, and many other materials soluble in oil solvents from the insoluble materials with which they are associated. The apparatus is particularly advantageous where the insoluble portion includes appreciable amounts of minute particles difficult to separate from the solution or presents a very large surface to the solvent because of a porous or finely divided structure having appreciable adsorptive properties or presents narrow channels containing sufficient water to impede the free passage of oily solvents and where it is undesirable to dry such moist material completely before extraction.

It is an object of my invention to provide an extractor which is automatic in operation and which operates continuously with little or no care. My extractor acts to boil the solvent, to condense the vapor at the top of the extractor, to shower the condensed solvent over the material to be extracted, and to return the solvent to the evaporator to again be boiled.

It is an object of my invention to provide a draining means which acts to return the solvent to the evaporator as long as the process is in operation, but which may be operated to drain the liquid out of the extractor when desired. This means is of importance to the device, as by this means the operation is greatly simplified.

It is a feature of my invention to provide a means of showering the solvent entirely over the material to be extracted at intervals, rather than to submerge the material constantly in the solvent, or rather than permitting a constant drip of solvent onto the material, thus imperfectly distributing the solvent. My apparatus is provided with a means of spreading the liquid over the entire surface of the extracted material.

It is an added feature of my invention to provide a condenser of proper shape to permit the condensed solvent to drain down into a receptacle from which it is showered over the material to be extracted. Thus the liquid can be quickly collected, to be showered over the material.

These and other objects and novel features of my invention will be more fully and clearly set forth in the following specification and claims.

This application is a division of my application, Serial No. 368,727, filed June 5, 1929, for improvement in Method of separating materials soluble in oily solvents from insoluble materials.

In the drawing forming a part of my specification, the figure illustrates my extractor diagrammatically.

I have illustrated in the drawing my automatic continuous extractor wherein an open topped evaporator dish D which is comparatively flat and which is provided with a wide open top is associated with a heater H. The dish D rests upon or above the heater H. Projecting upwardly from the dish D, I provide a cylinder G preferably of glass which fits to the dish D removably with a ground or tight joint. Within the glass cylinder G, I provide a filtering means A which is supported upon, or by a suitable supporting tray B. The tray B is suspended above the dish D in a manner so that the vapors of the solvent in the dish D will be carried up around the filter A and the tray B, within the cylinder G.

The upper end of the cylinder G is closed by a suitable condensing means such as C. Below the condenser C is suspended a collector S for receiving the condensed solvent which is precipitated by the condenser C. The condenser C may be cooled by water or by other suitable means. The collector S is provided with a siphon 10 and a drain tube 11 upon the end of which is a spreader 12 so that when the collector S receives a certain amount of solvent it is dispensed out over the material contained in the filter A. This provides an action which is important in the operation of the apparatus, as it spreads liquid over the material in the filter A in such a manner as to flood the same thoroughly over the material in the filter A. The siphon 10 may be operated by a float 13, or it may be a fixed part of the tube 11.

I also provide in my extractor a drain F from the tray B and extending out of the side of the same. This drain is provided with a closure cap T preferably made of glass for visibility. The drain F extends through a collar 14 which is sealed by the gasket 15 and the nut 16 in the side wall of the casing G. This collar 14 is provided with an underdrain passageway 17 leading from the cap T so that the liquid may pass from the outer end of the drain F back into the dish D through the passageway 17. In this manner at the end of the process the solvent may be drained off from the extractor into an outside container (not shown), leaving the extracted material virtually dry in the evaporating dish D, through the drain F, the cap T being removed for this purpose. A feature of my form of extractor resides in providing an evaporating dish which is made of refractory porcelain or silica or other suitable material which will stand a burning heat so that the extracted material in the dish may be burned off to leave any foreign residue in the dish to be analyzed or weighed if desired.

My extractor is automatic in its operation, and by its use a large sample of material may be extracted at one time in the laboratory. As the extractor is entirely sealed, no fumes can escape into the laboratory. Owing to its automatic operation it requires little or no attention. By this means a large sample can be completely extracted, as in my extractor the filter is maintained sufficiently clear to permit the solvent to pass through the same readily and quickly.

The formation of a dish D at the bottom portion of the casing is removable from the cylinder G for the purpose of collecting and weighing and otherwise manipulating the extracted material. The residue remaining when the solvent is all boiled off is by this means readily weighed, and in this manner the amount of soluble material removed from the insoluble material by the solvent can be readily determined. If it is desired, however, the casing can be formed with a unitary bottom, or with a closure at this end of the casing within which an evaporating dish or receptacle may be inserted. In such a construction, however, the other essential features of the apparatus could be substantially the same. In such a modified construction it would still usually be of advantage to provide a means F for draining the solvent through the side of the casing, and the connected means for returning this liquid into the evaporating dish for continuous action.

By arranging a joint between the tray B in the nature of a connection 18 which connects the drain F to the tray, it is possible to apply suction on the suitably arranged filter A through the drain F so as to withdraw the last portions of liquid which would otherwise be held by capillary attraction to the insoluble material. The manner in which such a suction could be applied is believed to be readily understandable.

The type of dish D used in connection with my extractor is frequently more convenient for analytical purposes than flask and tube-shaped containers heretofore used in extractors. The broad flat under surface on the dish D permits quick heating of the liquid when desired.

It is obvious that the extractor of my design will very thoroughly and quickly extract soluble materials from the insoluble in the filter A, and it is also obvious that very little solvent is necessary in order to provide a continuous action, as the solvent is used over and over, being boiled after each application to remove much of the impurities.

In accordance with the patent statutes, I have described the principles of operation of my extractor, and while I have endeavored to set forth the best embodiment thereof, I desire to have it understood that this is only a means of carrying out my invention, and that obvious changes can be made within the scope of the following claims without departing from the spirit of my invention.

I claim:

1. An extractor including, an evaporating dish adapted to be heated by a heater, a closed casing extending above said dish and sealed with respect thereto, a filtering means adapted to support the material to be extracted mounted within said casing above the level of said dish, a condenser mounted in said casing above the level of said filtering means, an intermediate collector and intermittently operable dispenser secured below the level of said condenser to collect moisture draining from said condenser and positioned between said condenser and said filtering means, an outlet extending through said casing below the level of said filtering means and means beneath said filtering means and connected with said outlet for drawing off the solvent from said filtering means to leave the extracted material in the evaporating dish virtually dry.

2. An extractor including, a closed casing, a filter mounted within said casing, an evaporating compartment within said casing adapted to be heated, a condenser mounted in said casing at the top thereof, a collector associated with said condenser between said condenser and said filter having means for automatically and intermittently showering the material over said filter, and means beneath said filter for drawing liquid off from the filter and out of said extractor.

3. An automatic extractor including, an evaporating dish, a condenser, means confining the vapors from said evaporating dish to convey them to said condenser, a filter positioned to receive moisture condensed by said condenser, an intermittently operable collector and dispenser positioned to intermittently and automatically convey quantities of liquid on to the material in the filter extending externally of said confining means, a drain from said filter having a by-pass for by-passing liquid from the drain back into the evaporating dish.

4. An extractor including an evaporating portion, a condenser portion, means connecting said portions to direct gases from said evaporating portion to said condenser portion, a liquid collector supported below said condenser to receive condensed liquids therefrom and including means for automatically intermittently dispensing liquid, a filter mounted below said collector adapted to support material to be extracted, adapted to receive liquid flooded thereover by said collector.

5. A continuous extractor including a closed casing, means for supporting material to be extracted within said casing, means below the level of said supporting means within said casing for vaporizing a solvent within said extractor means mounted in said casing above the level of said supporting means for condensing said vaporized solvent, means in said casing below said condenser for collecting and automatically intermittently dispensing the condensed solvent over said material to be extracted on said supporting means, and drain means in said casing for conveying the solvent from said supporting means to said vaporizing means.

6. A continuous extractor including a closed body portion, an evaporating means for solvent in said closed body portion, means for supporting materials to be extracted mounted in said body portion above the level of said evaporating means, a condenser mounted in said body portion above the level of said supporting means, means below said condenser for collecting the condensed solvent and dispensing the same intermittently over the material being extracted, means below said supporting means for draining the solvent from the material being extracted out of said closed body portion, and means directing said solvent from said draining means through a by-pass into said body portion, to be returned to said evaporating means.

VICTOR H. ROEHRICH.